Feb. 13, 1940.　　　　W. RIEGER　　　　2,190,586
VALVE CONTROL
Filed Jan. 4, 1938　　　5 Sheets-Sheet 1
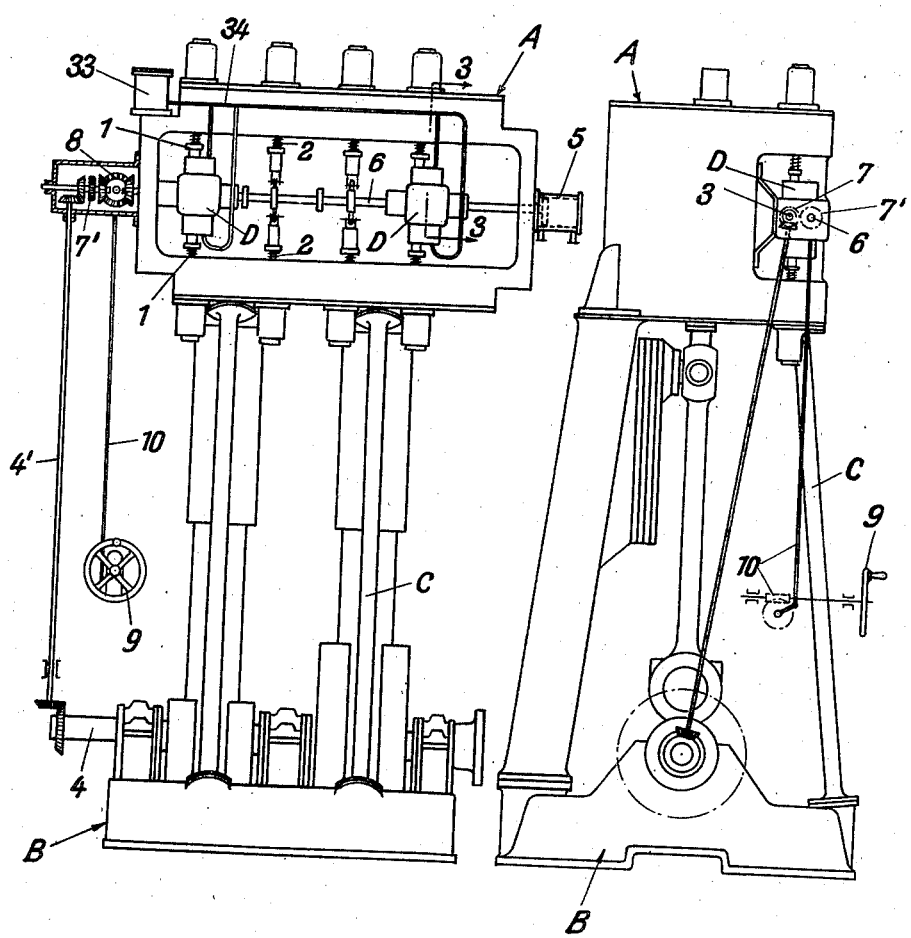
Wilhelm Rieger
Inventor:
BY Bailey & Carson
Attorneys Feb. 13, 1940.  W. RIEGER  2,190,586
VALVE CONTROL
Filed Jan. 4, 1938   5 Sheets-Sheet 2
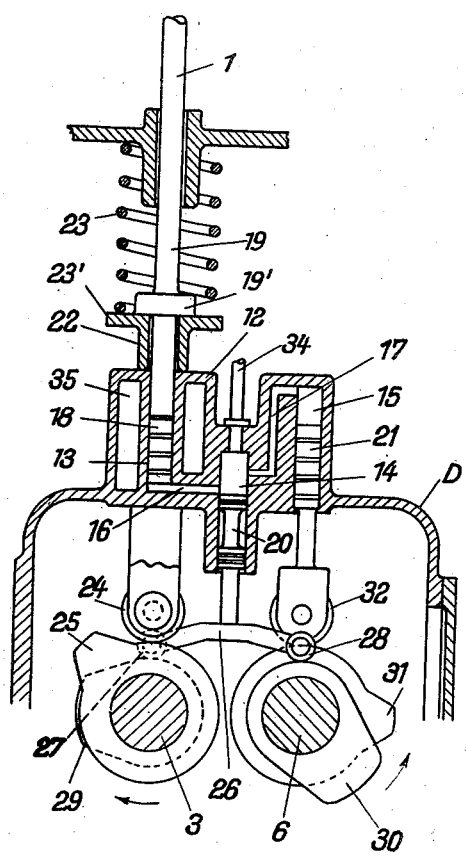
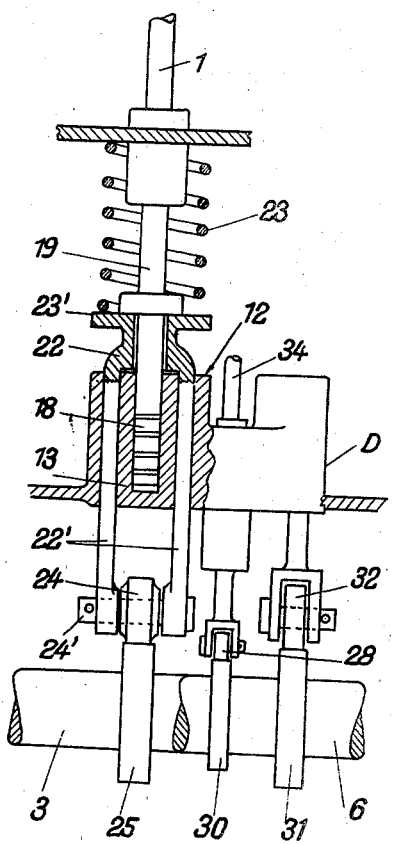
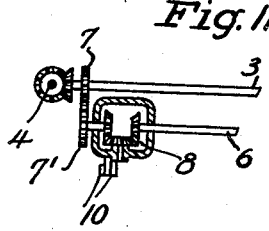

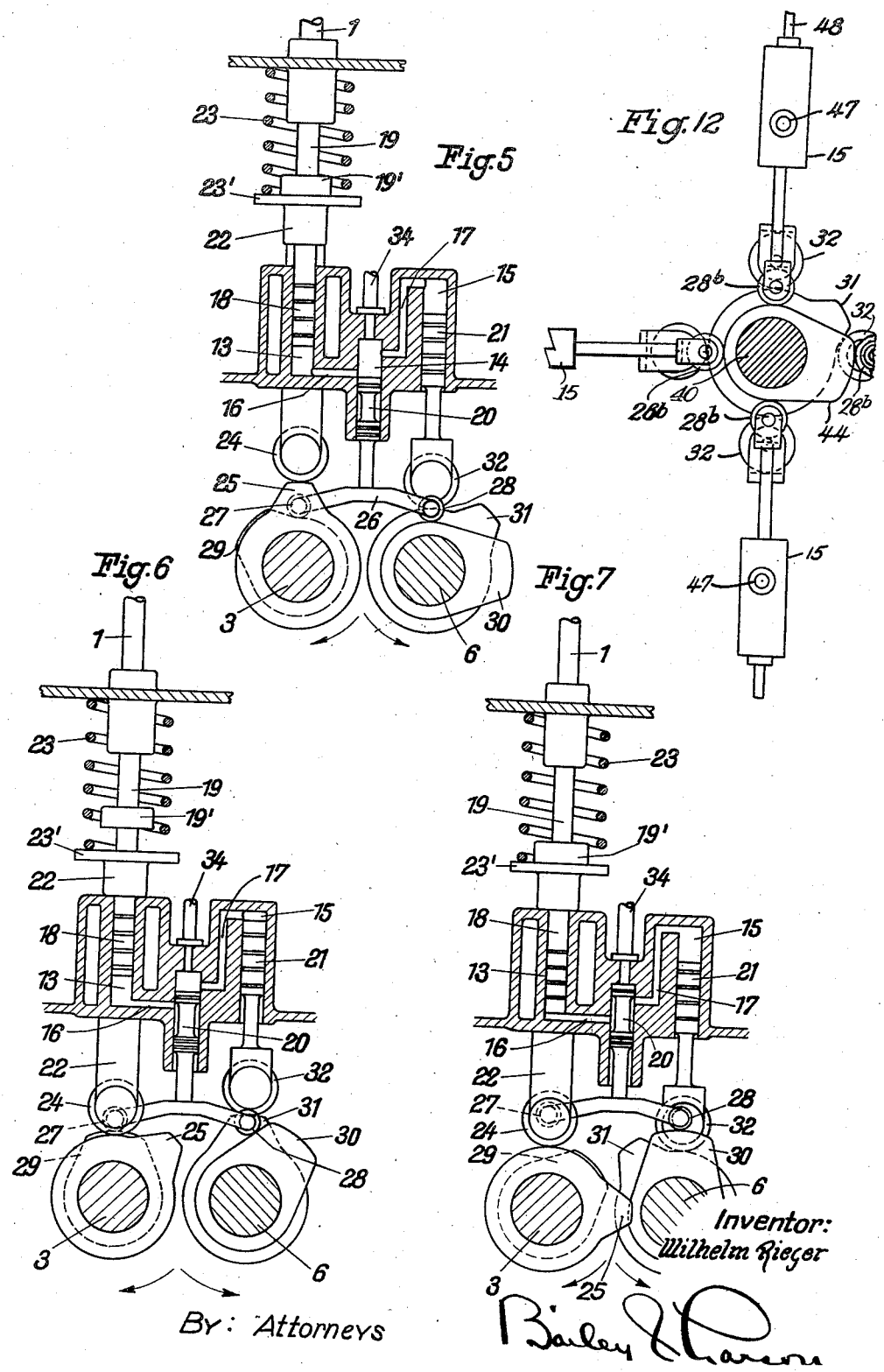

Feb. 13, 1940.  W. RIEGER  2,190,586
VALVE CONTROL
Filed Jan. 4, 1938  5 Sheets-Sheet 4

Wilhelm Rieger Inventor.

BY Bailey ... Attorneys

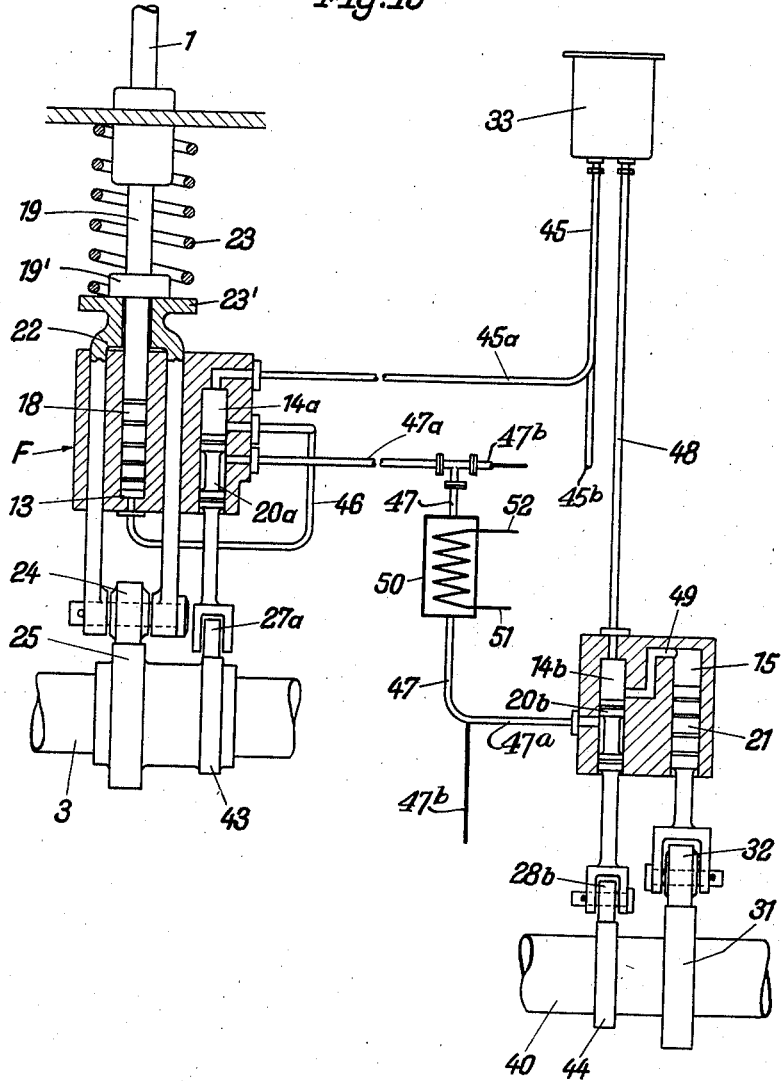

Patented Feb. 13, 1940

2,190,586

UNITED STATES PATENT OFFICE 2,190,586

VALVE CONTROL

Wilhelm Rieger, Kassel-Wilhelmshohe, Germany

Application January 4, 1938, Serial No. 183,395
In Germany January 7, 1937

15 Claims. (Cl. 121—127)

This invention is directed to a valve control mechanism for internal combustion or for steam engines in which the movement of the valves is cushioned by means of a positively controlled oil cushion.

In the prior art, valve controls are of two general types, each of which acts hydraulically to lift the valve. In one type a valve lever rests on a cam shaft and is connected to an oil cylinder for lifting the valve, and in which the oil is allowed to escape at a varying rate of speed so that the length of time for the opening and closing of the valve may be regulated. In a second type, the lifting of the valve is performed hydraulically by a piston connected to the valve stem which cooperates with a second piston in an oil cylinder so that the oil which is supplied to the cylinder in which the first piston is contained may be regulated, and thus the opening and the closing of the valve may be regulated.

In both of these types, the closing movement of the valve takes place under the action of a spring or by the dropping of the valve under its own weight, and only the pressure of the valve stem against the oil cushion controls the rate of emergence of the oil from the cylinder, no other regulation of the escaping oil being made. As the closing valves have a considerable velocity when closing, the oil cushion is not sufficient usually to cushion the valves so as to prevent impacts between the valve and the valve seat, and consequently noisy operation results.

It is therefore an object of this invention to form a substantially noiseless valve operating mechanism.

Another object of the invention is to provide an oil cushion beneath the valve stems which is positively regulated so as to prevent impacts between the valve head and the valve seat.

Still another object of this invention is to provide a mechanism in which the cam surfaces for operating the valves are kept in constant engagement so that no impact can occur at this point.

Another object of the invention is to provide a mechanism in which pivoted levers are eliminated so that a more compact and silent mechanism may be used.

Another object of this invention is to provide a means whereby the oil cushion beneath the valve stem may be created under pressure and be released under a pressure which is so regulated that the valve head may set quickly, yet quietly, upon the valve seat.

A further object of the invention is to lift the valve by a direct mechanical connection to a cam, and to drop the valve under the control of cam regulated hydraulic means.

In general these objects of this invention are obtained by providing a mechanical means for the lifting of a valve stem, a means for placing an oil cushion beneath the stem, and means for lowering the valve raising mechanism before the valve itself is dropped through the releasing of the oil cushion beneath the valve stem. This valve cushion is then released in a positively controlled manner so that the rate of fall of the valve can be regulated and the valve be cushioned against impact with the valve seat. The regulating means is preferably formed by a piston located in a cylinder beneath the valve stem, said cylinder being connected to an oil supply cylinder and an oil release cylinder. An auxiliary cam shaft is provided in order to operate a piston located in the oil release cylinder, and a piston in the oil supply cylinder is operated by cams placed on both the main and auxiliary cam shafts. The piston in the oil supply cylinder maintains the oil in the valve stem cylinder for a predetermined time, and when this piston releases the oil from the valve stem cylinder, the oil passes to the oil release cylinder at a rate determined by the movement of the piston in the oil release cylinder, this movement being controlled by cams on the auxiliary cam shaft.

The means by which these and other objects of this invention may be obtained are fully described in the following specification, taken in connection with the accompanying drawings.

In the drawings:

Fig. 1 is a front view of a steam engine showing the location of the valve control means of the invention.

Fig. 2 is an end view of Fig. 1.

Fig. 3 is an enlarged sectional view taken on the line 3—3 of Fig. 1 and shows the position of the cams in the closed position of the valve.

Fig. 4 is a side view of Fig. 3.

Figs. 5, 6, and 7 are sectional views similar to Fig. 3; Fig. 5 shows the position of the cams when the valve is open; Fig. 6 shows the position of the cams just prior to the closing of the valves; and Fig. 7 shows the position of the cams while the oil is being released from beneath the valve stem.

Figure 8:
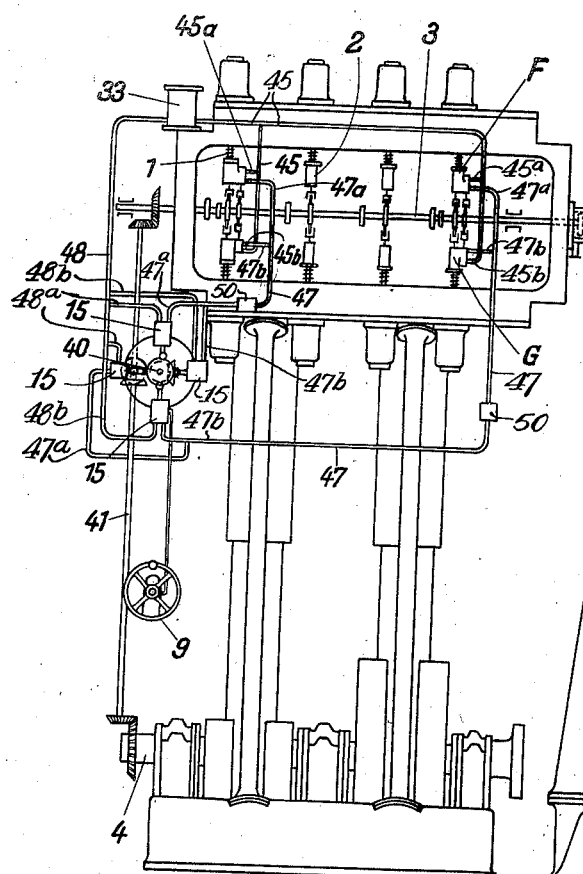

Fig. 8 is a front view of a modified form of the invention in which a centralized valve control mechanism is used.

Figure 9:
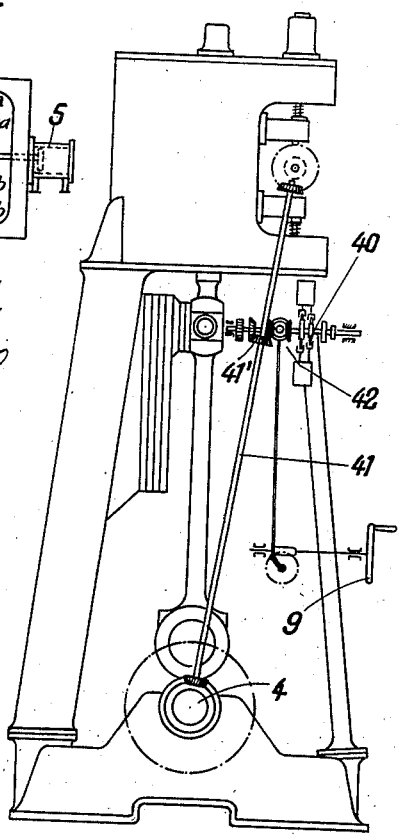

Fig. 9 is a side view of Fig. 8.

Fig. 10 is a view of the operating mechanisms for the valves showing the association of the elements enlarged from Figs. 8 and 9.

Fig. 11 is a plan view of the valve time setting mechanism of Fig. 1, and

Fig. 12 is a plan view of the arrangement of the control mechanism of Figs. 8 and 9 about a central cam.

As shown in Fig. 1, the invention is applied to a steam engine having a conventional cylinder block A, a base B, and connecting legs C. The intake valves are shown at 1 and the exhaust valves are shown at 2, these valves being operated by cams mounted on a cam shaft 3. The oil cushioning mechanism is contained within housings denoted generally at D which envelop the base of the valve stems and the various piston chambers. Main cam shaft 3 is driven from the crank shaft 4 through intermediate geared connection indicated at 4' and consisting generally of bevel gears with interconnecting driving rods. The cam shaft 3 may be axially displaced by such means as a motor 5 mounted upon one end thereof so that the engine may be driven forwardly or backwardly.

An auxiliary cam shaft 6 is mounted adjacent and parallel to the main cam shaft 3. Spur wheels 7 and 7' are mounted respectively upon shaft 3 and shaft 6, said wheels engaging each other to provide for a rotation of shaft 6 with shaft 3. Between wheel 7' and shaft 6 is mounted a tiltable bevel spur gear 8, this gear being tiltable by operation of a hand wheel 9 through geared connection 10. Tilting of this wheel 8 causes the timing of the cam shaft 6 to be made either leading or trailing with respect to the position of the cam shaft 3.

The valve housings indicated generally at D surround cams mounted upon the cam shafts 3 and 6, and each provides a housing for three piston cylinders, note Figs. 3 to 7. These piston cylinders are contained in the upper portion 12 of the housing D and are shown at 13, 14, and 15. Cylinder 13 communicates through duct 16 with cylinder 14, and cylinder 14 communicates through duct 17 with cylinder 15. Pistons 18, 20, and 21 are mounted in these cylinders.

A valve stem is shown at 19, which valve stem is provided with a stop 19' and terminates in piston 18 located in cylinder 13. Loosely surrounding the portion of the valve stem below the stop 19' is the top of a valve lifting member 22, which member is bifurcated below the stop so that the legs 22' pass by the chamber 13 and rest upon a cam 25 through a roller 24 connected by a wrist-pin 24' to the lower ends of the legs.

Cam 25 is mounted upon main cam shaft 3. The cam track of cam 25 is shown in Fig. 3 and is such, as may be seen by making a successive inspection of Figs. 3 to 7, as to raise the intake valve to its highest position and then to drop the member 22 down to its lowest position (note Fig. 6), without drawing the valve down with it. The lowering of the member 22 is caused by a spring 23 which bears upon the shoulder 23' of member 22, and consequently keeps the roller 24 in constant contact with the surface of cam 25.

A piston 20 is contained within cylinder 14, the lower end of which is connected to an inverted T-shaped member 26. At the ends of the head of the inverted T are rollers 27 and 28, which rollers, respectively, engage cams 29 on shaft 3, and 30 on auxiliary shaft 6. Therefore the position of the piston 20 within cylinder 14 is determined by either cam 29 or cam 30. From Fig. 7 it is noted that when cam 30 has elevated piston 20, the roller 27 is lifted from the surface of the cam 29. However, the position of the roller 28 bearing on cam 30 at its lowest position is equal to the lowest position of the roller 27 on cam 29, and therefore the raising and lowering of these rollers is accomplished without an appreciable impact between the rollers and the surfaces of the cams.

Piston 21 in cylinder 15 is controlled from auxiliary cam shaft 6 by means of a piston rod which terminates in a roller 32 bearing upon cam 31 mounted upon auxiliary cam shaft 6.

Oil or other operating fluid is supplied to the various valve operating mechanisms shown in Fig. 1 from a container 33 through tube 34 to the supply cylinder 14. The fluid may be passed through the tube under atmospheric or under additional pressure.

The operation of this apparatus is as follows: The timing of the auxiliary cam shaft with respect to the main cam shaft is set by means of the hand-operated wheel 9. With the intake valve closed, the positions of the cams and operating pistons are as shown in Fig. 3. Fluid fills the cylinder 14. As cam 25 rotates clock-wise (see Fig. 5) the intake valve is lifted by member 22 bearing against stop 19' on the valve stem, compressing spring 23, and raising piston 18. Because of the pressure of the fluid coming from supply chamber 33, the fluid flows into cylinder 13 beneath piston 18. Upon further rotation of the cam 25, the member 22 is dropped and is kept in contact with the cam by pressure from spring 23. At the same time, cam 29 has raised piston 20 through roller 27, and closes the outlet orifice of conduit 16. Therefore, the valve stem cannot drop because of the oil contained in cylinder 13 beneath the piston 18. Also, at the same time, piston 21 has been raised by the cam 31 moving counter-clockwise on auxiliary cam shaft 6, and the fluid contained in cylinder 15 has been forced under pressure through the conduit 17 back into the conduit 34 toward the supply chamber 33 (see Fig. 6). To allow the valve to drop, and utilizing the fluid contained in chamber 13 as a cushion against the sudden dropping of the valve such as would cause an impact between the valve head and the valve seat, the conduit 16 is brought into communication with the conduit 17 by further upward movement of the piston 20 which has a reduced central portion so as to allow communication therearound. Fluid then escapes from cylinder 13 through conduits 16 and 17 to cylinder 15, and the rate of escape of this fluid is controlled by the downward movement of the piston 21 as regulated by the cam 31. As soon as the valve has seated, piston 20 is lowered to its initial position as shown in Fig. 3.

It is to be noted that the action of the piston 21 gives a very good positive control of the rate of release of the fluid from beneath piston 18. It is also noted that not only is the fluid used as a cushioning means, but that the lowering of the piston 21 causes the fluid to form a positive connection between the pistons 18 and 21 and enables a very close regulation to be made of the piston 18 by means of the piston 21. While the valve may have a downward pressure on the fluid cushion by means of its own weight, such pressure may be increased by means of a spring, or, in a steam engine, by the steam pressure in the main steam cylinder.

The cylinder 13 is preferably surrounded by a cooling chamber 35 which is made a part of the housing 12. This is an advantageous feature inasmuch as the valve stem 19, which is usually made of metal, is a very good conductor of heat. The cooling chamber prevents the heat from being transmitted to the oil and to the adjacent operating portions of the valve mechanism. Furthermore, it is noted that the connection between the fluid supply chamber 14 and the supply container 33 is kept constantly open. Therefore, any fluid which may leak past the pistons is immediately replaced and the timing of the valves is kept constant.

In the form of the invention illustrated in Figs. 1 through 7, a fluid supply cylinder and a fluid release cylinder is provided for each valve in the engine the two cylinders being contained within the same casing. It is possible, however, to remove the fluid release cylinder from each individual valve and to put a plurality of the fluid release cylinders around a single cam to be operated thereby. This structure is shown in Figs. 8 through 12, and has the advantage that a single main cam shaft may be used to operate the intake and exhaust valves of the engine, and a small auxiliary cam shaft can be located upon any portion of the engine, around which are mounted a plurality of fluid supply cylinders and a number of fluid release cylinders. Then a first cam on the auxiliary shaft operates all the pistons in the fluid supply cylinders, and a second cam on the auxiliary shaft operates all the pistons in the fluid release cylinders.

In Figs. 8, 9, and 10 the inlet valves are again shown at 1 and the exhaust valves at 2. In Fig. 8 each of the valves F and G is controlled by its individual cylinder 15 located adjacent auxiliary shaft 40. Four cylinders are shown for the four inlet valves 1 illustrated in Fig. 8. All of the cylinders 15 are connected by branch pipes to a common conduit 48 which in turn connects with reservoir 33. A single conduit 45 connects all the valves 1 with reservoir 33 by means of branches. Further, two cylinders 15 are connected with a pair of valves, as the valves F and G, by means of a conduit 47 and branch conduits to the cylinders and valves.

Fig. 10 illustrates the construction of valve F and its corresponding cylinder 15. Valve stem 19 is connected with piston 18 mounted in cylinder 13, as in Figs. 1 to 7. Located adjacent cylinder 13 is a first supply cylinder 14a in which is mounted a supply piston 20a operated by cam 43 on main cam shaft 3 through roller 27a. Cylinder 14a communicates with container 33 through branch 45a connected to conduit 45, a second branch 45b similarly serving valve G. Cylinder 14a further communicates with cylinder 13 through tube 46, and still further communicates with a second supply cylinder 14b by means of conduit 47 and branch 47a. Another branch 47b similarly serves valve G. Cylinder 14b communicates with container 33 through conduit 48 and branch 48a, the branch 48b likewise serving valve G.

Supply cylinder 14b further communicates with fluid release chamber 15 through conduit 49. A piston 21 in cylinder 15 is operated through a roller 32 by cam 31 mounted upon auxiliary cam shaft 40. The piston 20b mounted in cylinder 14b is operated through roller 28b by a cam 44 mounted upon auxiliary cam shaft 40. As shown in Fig. 12, the four cylinders 15 are operated from the cams on the auxiliary cam shaft.

As shown in Fig. 9, the setting of the auxiliary cam shaft with respect to the angular position of the main cam shaft may be accomplished from hand wheel 9 and connecting mechanism 42. The drive for the main cam shaft is taken off from the main engine shaft by means of shaft 41 which acts as a pinion for a bevel gear 41' used to drive the auxiliary cam shaft 40. The operation of this embodiment of the invention is as follows:

The angular position of the auxiliary cam shaft with respect to the main cam shaft is set by means of hand wheel 9. Fluid from container 33 fills supply cylinder 14a and supply cylinder 14b through the conduits 45 and 48, respectively. As valve stem 19 is being lifted by means of elements 25, 24, 22, 19', to its highest position, the piston 20a is also raised by cam 43 and the roller 27a to its highest position, at which point conduit 47, 47a communicates through the space around the piston 20a with conduit 46. The valve stem cannot drop because of the oil now contained in the conduits 46 and 47. Is is to be noted that, at this time, piston 20b in cylinder 14b is still in its lowest position as shown in Fig. 10. Therefore, piston 21, when rising in cylinder 15, because of cam 31, is ejecting fluid from cylinder 15 through conduits 49 and 48 back into supply container 33. Just after the piston 21 reaches its highest position, the piston 20b is raised by cam 44 to connect the conduits 47 and 49 and therewith the cylinders 13 and 15 through the conduits 46, 47a, 47 and 49. The release of the fluid from cylinder 13 is accomplished by further rotation of the shaft 40 and cam 31 so that the piston 21 moves downwardly. Therefore fluid below the piston 18 in cylinder 13 may escape through conduits 46, 47a, 47, 49 into cylinder 15, and valve stem 19 is lowered. The rate of escape of the fluid is regulated by the position and downward movement of piston 21. As in Fig. 1, the downward pressure of the valve can be obtained by means of a spring or the like. Also, the valve is lifted mechanically and is lowered under the control of cam operated hydraulic means.

Supply conduits 45 and 48 from container 33 ensure that the amount of fluid is kept constant throughout the operation of the device, and that no harm is done by loss of fluid through leakage. The fluid can be cooled by means of a cooling coil 50 connected to inlet 51 and outlets 52 and arranged intermediate the length of the tube 47.

It is important to note that with respect to both of the forms of the invention described, the movement of the fluid takes place in substantially one direction, that is, it can be said that fluid coming from the container 33 is supplied to the cylinder 13, then to the cylinder 15, and then back to the container 33. The setting of the valves is effectively and positively accomplished through hydraulic means, and a noiseless operation of the motor is ensured.

Having described mechanisms by which I have achieved the objects of my invention, what I claim is:

1. A valve control mechanism comprising mechanical means for opening a valve, independent hydraulic means for holding said valve open, and means for releasing said hydraulic means and regulating the closing of said valve.

2. A valve control mechanism comprising a cam operated mechanical means for opening a valve and independent cam controlled hydraulic means for regulating the closing of said valve.

3. A valve control mechanism comprising a valve having a valve stem, mechanical means for moving said stem to open said valve, means for placing a hydraulic medium behind said stem for maintaining said valve in open position, means for releasing said fluid medium, and means for positively controlling said releasing means.

4. A valve control mechanism comprising a valve having a valve stem, a cam, cam operated means to move said valve into open position, means to inject a fluid medium beneath said stem, a second cam, and means operated by said second cam to regulate the release of said fluid medium from beneath said stem.

5. A mechanism for operating valves comprising valves, main and auxiliary cam shafts, valve lifting mechanisms operated by said main cam shaft for mechanically opening said valves, means for maintaining said mechanisms in contact with said main cam shaft irrespective of the positions of said valves, hydraulic means for maintaining said valves in open position, and hydraulic means operated by said auxiliary cam shaft for regulating the closing of said valves.

6. A mechanism as in claim 5, said hydraulic means for maintaining said valves in open position comprising means for supplying fluid beneath the stems of said valves, and cam operated pistons for keeping said fluid beneath said valves for predetermined intervals.

7. A valve cushioning apparatus comprising a valve having a valve stem with a stop thereon, a first piston joined to one end of said stem, a cylinder for said piston, a second cylinder having a second piston therein, and a third cylinder having a third piston therein, means to supply fluid from a supply container to said second cylinder, a first conduit means between said first and second cylinders, a second conduit means between said second and third cylinders, means bearing against said stop to open said valve and to move said first piston, means to move said second piston to seal fluid beneath said first piston, and means to move said third piston to regulate the release of said fluid from beneath said first piston after further movement of said second piston to enable the release of said fluid.

8. An apparatus as in claim 7, said second piston having a reduced midsection to allow fluid passage therearound.

9. An apparatus as in claim 7, said means bearing against said stop comprising a bifurcated member extending past said first cylinder, a main cam shaft having a cam thereon, and means for keeping said bifurcated member in constant contact with said cam irrespective of the position of said stop.

10. An apparatus as in claim 7, a main cam shaft, and an auxiliary cam shaft, said means to move said second piston comprising an inverted T-shaped connecting rod movable by cams on either of said shafts.

11. An apparatus as in claim 7, a main cam shaft and an auxiliary cam shaft, a cam on said main cam shaft for operating said means to open said valve, said means to move said third piston comprising a cam on said auxiliary cam shaft, and a connecting rod between said second cam and said third piston.

12. An apparatus as in claim 7, cooling means for said fluid.

13. An apparatus as in claim 5, a cam on said auxiliary cam shaft for operating a plurality of said regulating hydraulic means.

14. A valve cushioning apparatus comprising a valve stem, means for moving said valve stem, a first fluid supply cylinder having a first piston therein, means to move said first piston to allow fluid to pass beneath said stem, a second fluid supply cylinder having a second piston therein, a second means to move said second piston to allow fluid to pass to said first cylinder, and a third cylinder having a third piston therein, and means to move said third piston to regulate the rate of release of said fluid from beneath said stem.

15. In a valve mechanism a main cam shaft and an auxiliary cam shaft, mechanical means controlled by said main cam shaft to open valves, hydraulic means controlled by said auxiliary cam shaft to maintain said valves in open position and to regulate the closing of said valves, a main drive shaft, means to drive both of said cam shafts from said drive shaft, and means to vary the angular displacement of said auxiliary cam shaft with respect to said main cam shaft.

WILHELM RIEGER.